April 3, 1956     J. V. BARNES     2,740,511
OVERRUNNING CLUTCH
Filed Feb. 6, 1952     3 Sheets-Sheet 1
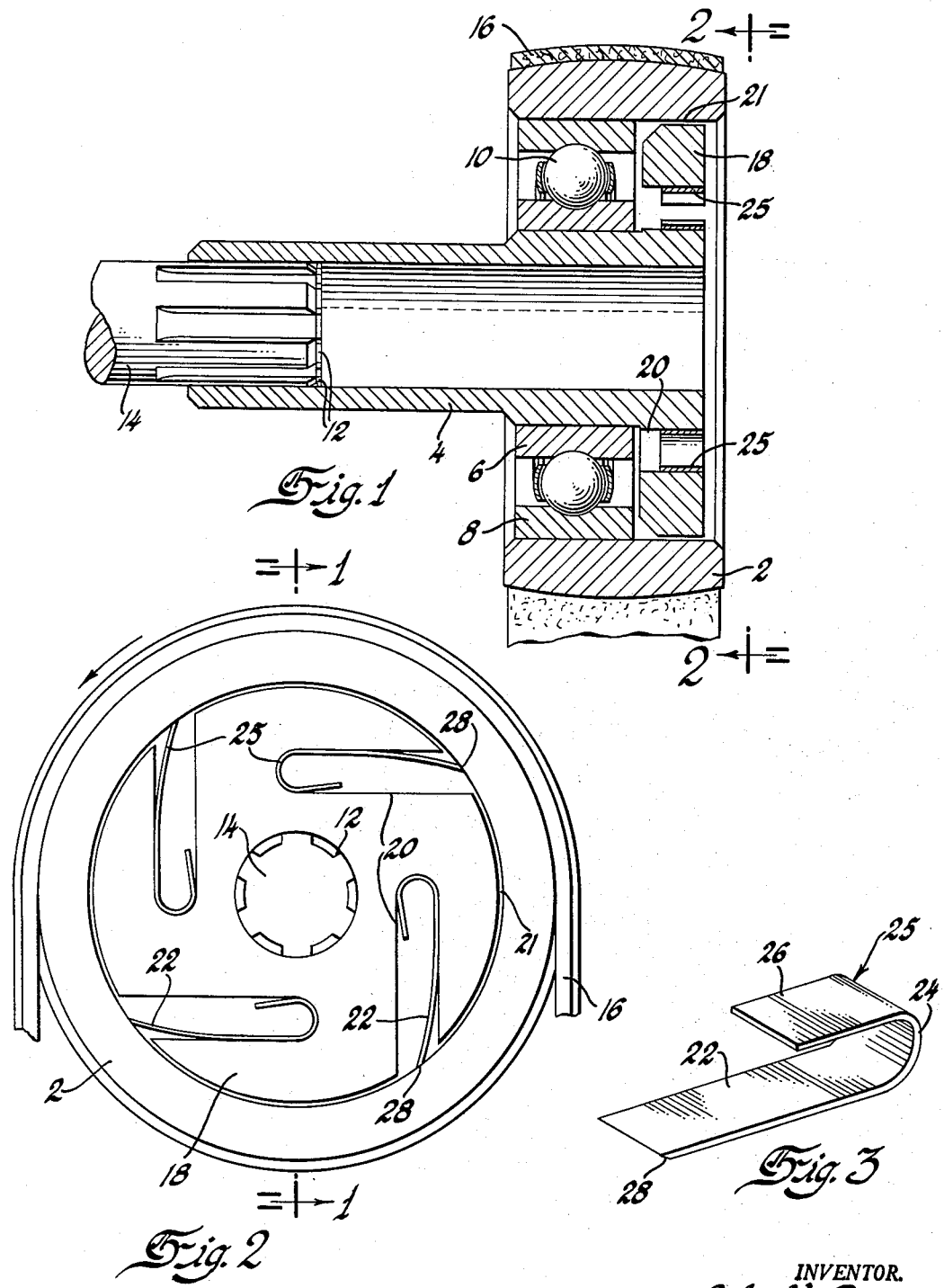
INVENTOR.
John V. Barnes
BY
Willito Helmig & Baillio
ATTORNEYS April 3, 1956   J. V. BARNES   2,740,511
OVERRUNNING CLUTCH Filed Feb. 6, 1952   3 Sheets-Sheet 2

INVENTOR.
John V. Barnes
BY
Willits, Helwig & Baillio
ATTORNEYS

April 3, 1956
J. V. BARNES
2,740,511
OVERRUNNING CLUTCH
Filed Feb. 6, 1952
3 Sheets-Sheet 3
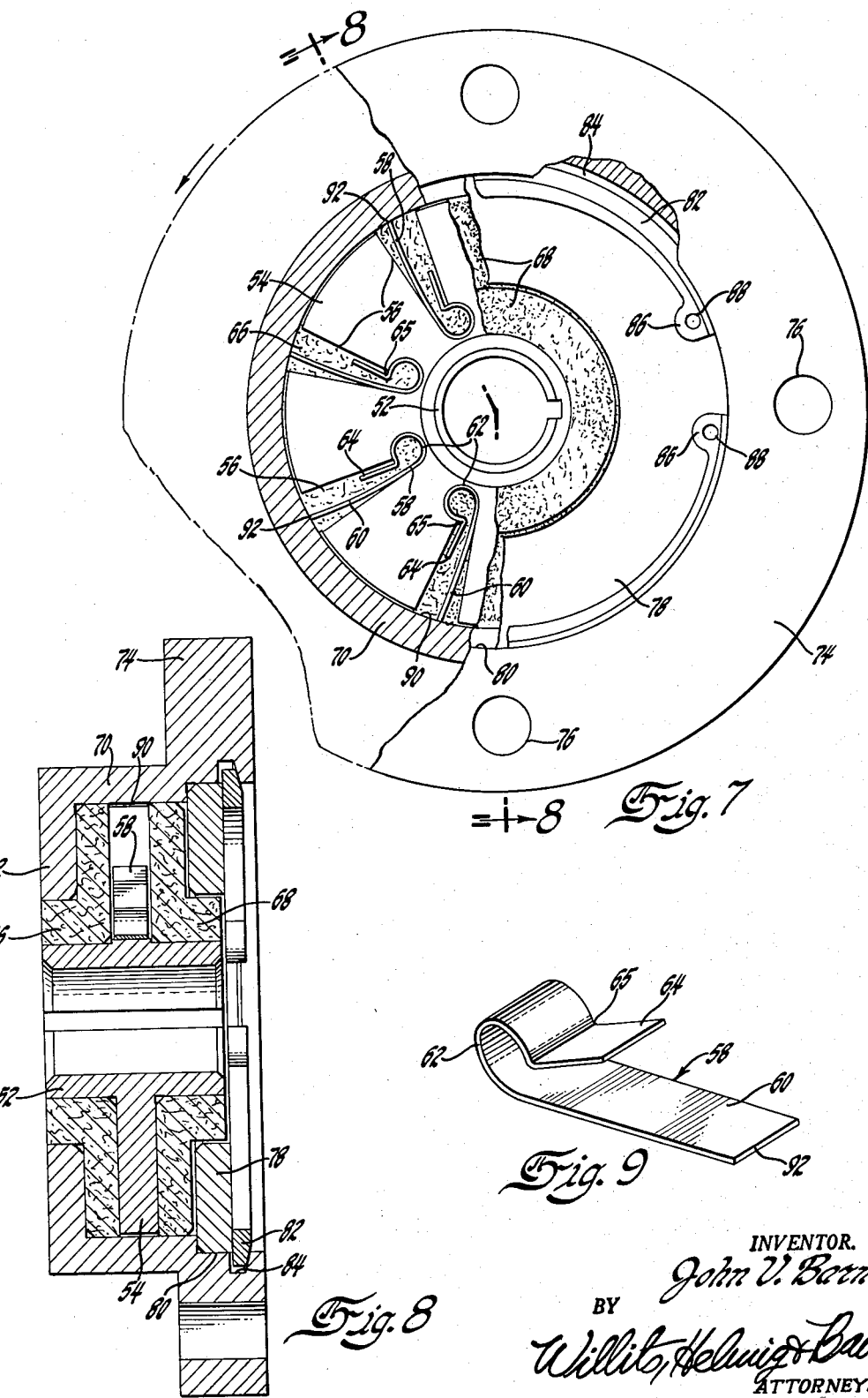
INVENTOR.
John V. Barnes
BY
Willis, Helmig & Baills
ATTORNEYS

United States Patent Office 2,740,511
Patented Apr. 3, 1956

2,740,511

OVERRUNNING CLUTCH

John V. Barnes, Detroit, Mich.

Application February 6, 1952, Serial No. 270,226

4 Claims. (Cl. 192—41)

This invention relates to force transmitting or driving means and more particularly to one-way or overrunning clutch means for transmitting torque from a driving to a driven member. Most one-way or overrunning clutches heretofore available have utilized highly stressed parts and have required very close tolerance machining in order to function properly. As a result they have usually been built with considerable mass and have been relatively expensive. For these reasons they have not been adaptable to light, low capacity applications or where price has been a factor. There are, however, numerous instances where small, inexpensive, low capacity clutches of this nature are needed, the use of which would simplify the total assembly.

It is therefore one of my objects in this invention to provide a low capacity, light, one-way clutch for transmitting power from a driving to a driven member.

One of my further objects is to provide a low capacity, one-way clutch which is simple to assemble and inexpensive to manufacture, requiring a minimum amount of machining operations and not necessitating close tolerances.

One of my still further objects is to provide a light, low capacity, one-way clutch for use in inexpensive constructions.

With these and other objects in view which will become apparent as the specification proceeds, my invention will be best understood by reference to the following specification and claims and the illustrations in the accompanying drawings, in which:

Figure 1 is a vertical sectional view showing a one-way clutch embodying my invention taken on the line 1—1 of Figure 2.

Figure 2 is an end view of the clutch taken on the line 2—2 of Figure 1.

Figure 3 is a perspective view of one of the force transmitting resilient springs embodied in my clutch.

Figure 7 is an end view partly in section of a still further modified form of my invention.

Figure 8 is a sectional view taken on line 8—8 of Figure 7; and

Figure 9 is a perspective view of a modified form of resilient force transmitting spring used in the modification shown in Figures 7 and 8.

Figure 4:
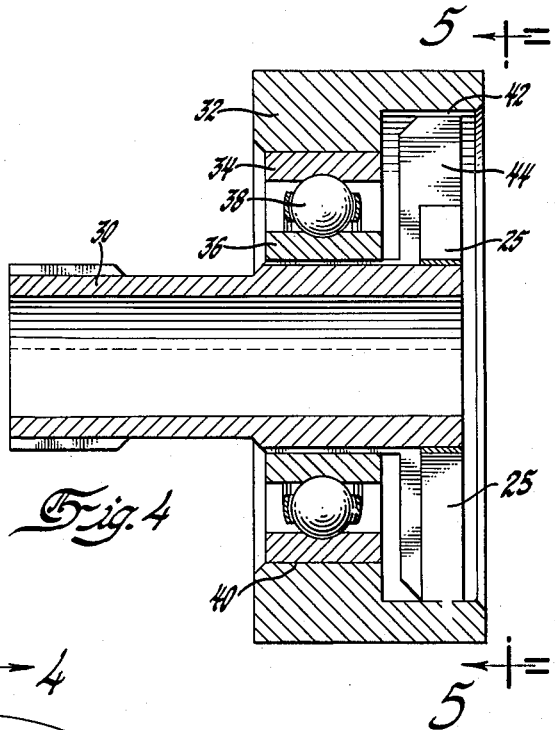
Figure 4 is a vertical sectional view of a modified form of clutch similar to Figure 1, taken on line 4—4 of Figure 5.

Referring now more specifically to Figures 1, 2 and 3, there is shown therein a cylindrical drum member 2 which is rotatably mounted on a hollow shaft 4 through a ball bearing assembly consisting of an inner ball race 6 pressed onto the hollow shaft 4, an outer race 8 pressed into the inner diameter of the member 2 and a series of ball bearings 10 between the two. Thus the cylindrical member 2 may rotate freely on the hollow shaft 4 through the intermediary of the bearing assembly. The hollow shaft 4 may have a series of internal grooves 12 adapted to be associated with a splined shaft end 14 for driving connection. The outer surface of the cylindrical member 2 may engage any driving means such as, for example, a belt 16, though any other means for a driving connection may be utilized.

An integral circular disc section 18 of the hollow shaft 4 is located inside a portion of the cylindrical member 2, the latter being of sufficient width to extend over the bearing assembly and the disc section. A series of chordal slots 20 are cut into the disc 18, as shown in Figure 2, and are roughly at right angles to each other, although various angles may be used, depending upon the number of slots utilized. These slots terminate adjacent the inner face 21 of the cylindrical member 2. The diameter of the disc 18 is such that the outer surface thereof is spaced a short distance from the inner surface of the cylindrical member 2, the actual spacing being non-critical and, therefore, facilitating the manufacture.

In order to provide means for transmitting rotative force from the driving member 2 to the hollow shaft 4, a series of relatively stiff, flat resilient spring members 25 such as shown in detail in Figure 3 are inserted in the chordal slots 20. These spring members are formed of a relatively long leg 22, an integral U-shaped bight 24, and a short leg section 26, substantially parallel to the longer leg 22 when formed. The outer end of the leg 22 is ground away to form a beveled edge 28 which is adapted to contact the inner surface of the cylindrical member 2. The distance across the U-shaped bight 24 is slightly greater than the distance across the base of the slot 20, making it necessary to force the two legs of the spring toward each other to insert the spring within the slot and therefore providing initial bias to hold the spring in place. The length of the leg 22 is slightly longer than the shorter side of the chordal slot 20 so that when the spring is placed in assembled position it will engage the inner surface of the member 2 with a slight resilient pressure.

It will thus be seen that if the belt 16 is driven in the direction of the arrow in Figure 2 that the inner surface of the cylindrical member 2 will be forced against the ends of the springs 25, tending to move them back into the slots and cause a driving or wedging connection between the cylindrical member 2 and the disc 18 to drive the hollow shaft 4. If, however, the driven member tends to overrun the driving member 2, the disc 18 may rotate in the same direction with the ends 28 of the springs 25 merely sliding over the internal surface of the driving member 2 with very slight friction. Immediately upon the driving member reaching the same speed or a greater speed than the inner disc, the driving action between the inner surface of the cylindrical member 2 and the disc through the ends 28 will immediately be resumed. The driving member 2 may be rotated in the opposite direction with respect to shaft 4 at any time without moving the driven shaft 4.

Any tendency for wear on the end surface 28 of the springs will merely permit the legs 22 to move further toward the shorter side of the slot and will give an even better gripping or wedging action for the drive. The amount of force that can be transmitted by such means depends of course on the actual dimensions of the parts used. It will be obvious that no close machining tolerances are necessary for the diameter of the disc and cylindrical member 2 nor for holding the lengths of the springs 25 to an exact figure and, therefore, the cost of making such a construction is reduced. The slots 20 may be machined easily with existing commercial apparatus.

Figure 5:
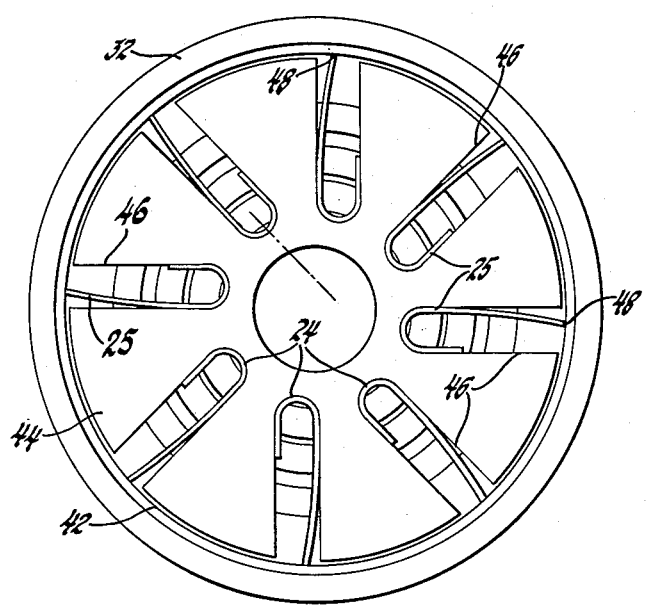
Figure 5 is an end view of the modified form shown in Figure 4 taken on line 5—5 of Figure 4.

Referring now to the modified form of my invention shown in Figures 4 and 5, there is shown therein a similar hollow drive shaft 30 with an integral disc section 44 of greater diameter adjacent one end and having mounted thereon a driving member 32 through the intermediary of a ball bearing assembly consisting of an outer race 34, an inner race 36, and a series of ball bearings 38 between the two. The inner race 36 is pressed onto the outer surface of the hollow shaft 30 to rotate therewith and the outer race 34 is pressed into an opening 40 within the circular driving member 32. A circular opening 42 is provided in one face of the driving member 32 of slightly larger internal diameter than the opening 40 to accommodate the integral circular disc portion 44 formed on the hollow shaft 30. Clearance is provided between the circumference of this portion 44 and the inner surface of the opening 42.

As in the previous instance, a series of slots 46 are provided in the disc section 44, one side of each slot being substantially on a diameter of the section. Resilient spring members 25 are inserted in these slots as in the previous instance and have their ends 48 forced against the inner surface 42 of the driving member 32. While they are not positioned at the same angle with respect to the inner surface 42 as the chordal slots shown in the first modified form, they perform the same function in the same manner. The legs of these springs are forced together to insert them in place and are then released when in the proper position to exert a spring pressure on the inner surface 42.

Figure 6:
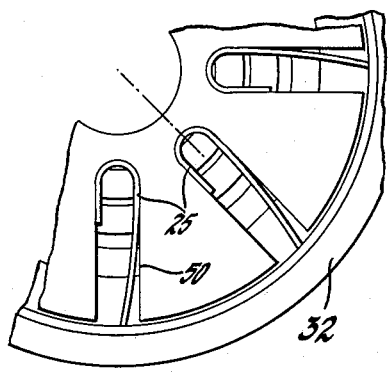
Figure 6 is a partial end view similar to Figure 5 in which the spring slots are located radially with respect to the supporting drum rather than slightly offset as shown in Figure 5.

The slots 46 could equally as well have their axes on radii of the disc and this particular form is shown in Figure 6 in which the slots 50 are on radii of the disc, the springs 25 being similar to those previously used except from the length and the fact that as the angle with respect to the driving member 32 changes, the angle of the engaging end surfaces 28 will of course vary so that this surface lies approximately parallel to the inner surface 42. The operation of this form of my invention is the same as that described with regard to that form shown in Figures 1, 2 and 3.

Referring now to the final modified form as shown in Figures 7 through 9 inclusive, there is shown a central hub member 52 which is adapted to be connected to a member to be driven. This hub member has a central integral disc section 54 in which there are cut a series of substantially radial slots 56 which carry a modified form of resilient spring 58. These springs 58 consist of a comparatively long flat portion 60, a curved section 62 which is approximately 270° of a circle and then a short bent-back section 64 forming a shoulder 65. The slots 56 are formed with approximately the same configuration to accommodate this form of spring. The reason for the extended circular section and shoulder of the spring is to resist centrifugal force at high speed rotation. An L-shaped flanged member 66 fits over one end of the central hub member 52 and has a slightly greater outer diameter than the central disc 54, lying parallel to one face of the section 54. A similar L-flanged member 68 of complementary form fits over the other end of the hub 52 and lies parallel to the opposite side of the disc-shaped portion 54 and is of the same diameter as the member 66. These three pieces form the central assembly. The L-shaped members 66 and 68 are formed of any self-lubricating material and their peripheries act as bearing surfaces for the driving member.

The outer or driving member consists of a substantially cylindrical central portion 70 having an integral inwardly directed flange 72 which is adapted to fit into the outer surface of the L-shaped flange 66 to retain the same when the central assembly is placed within the cylindrical section 70. At the opposite side of the member 70 there is provided an enlarged flanged portion 74 having a plurality of peripherally spaced openings 76 therein for connection to any type of apparatus which will drive the same. A circular retaining ring 78 is mounted in the opening provided by the L-shaped flange 68 and an enlarged central opening 80 in the inner surface of the driving cylindrical member 70. This ring holds the central assembly in position and is itself locked in by a locking ring 82 which snaps into an annular groove 84 on the inner surface of the flanged extension 74. This locking ring 82 is of shorter length than the complete circumferential length of the groove 84 and is provided at its ends with enlarged sections 86 having holes 88 therein into which means can be inserted and circumferential pressure applied to spring the ring out of its assembled position and permit disassembly of the clutch.

In this instance, therefore, the outer or driving cylindrical member 70 being attached to some force transmitting means, may rotate on the inner assembly as a bearing but rotation in one direction, i. e., that of the arrow in Figure 7, will drive the central assembly since the inner surface 90 of the member 70 engages and wedges the ends 92 of the plurality of resilient spring members 58 around the periphery and drives the central section, the hub 52 being connected to means which it is desired to drive. As in the former instances, if the hub assembly tends to move faster than the driving member 70 the ends 92 of the springs will merely slide over the surface 90 with a very small amount of friction and permit relative motion between the parts, thus providing a very simple one-way or overrunning clutch.

The direction of drive or engagement of the clutch can very easily be reversed by reversing the central assembly so that the ends of the springs are biased to wedge in the opposite direction. The load capacities of any of the clutch assemblies may be altered by varying the number of spring members used. No more than the necessary number to transmit the required force should be used as friction is increased.

I claim:

1. In force transmitting means, a first force transmitting member, a second force transmitting member mounted in juxtaposition thereto with only slight clearance, a plurality of slotted apertures in the second force transmitting member facing the adjacent portions of the first member, and resilient members mounted in each aperture whose thickness is less than the width of the aperture and whose length is greater than the distance from the interior end of the aperture to the surface of the first member to distort the resilient member and provide axial pressure thereon, said slotted apertures providing support for each resilient member substantially throughout its length, said resilient members engaging the surface of the first member at an angle of greater than 90° to provide wedging action and transmit force from the first to the second force transmitting member the bending moment on each resilient member being held substantially constant since a change in torque produces a change in the unsupported length of the member.

2. In force transmitting means, a driving member, a member to be driven thereby having a surface in juxtaposition to a surface of the driving member with slight clearance, a plurality of slotted apertures extending into the body of one of the members from the adjacent surface, a resilient member mounted in each aperture whose thickness is less than the aperture width and only slightly longer than the aperture but of greater length than the distance from the inner end of the aperture to the adjacent surface to apply axial pressure to the resilient member when in assembled position but to support the same, said resilient member engaging the surface of the other member than that within which it is mounted at an angle greater than 90° so that when force is applied to the driving member such force will be transmitted to the driven member through the resilient members to move the driven member maintaining the bending moment on each resilient member substantially constant but to permit independent movement of the driven member past the driving means in the same direction of movement.

3. In a clutch mechanism, a plurality of rotary members mounted for relative motion, one member extending at least partially within the other, a plurality of circumferentially spaced slots extending inwardly from the surface of the inner member in that portion which is surrounded by the outer member, resilient spring means whose thickness is less than the width of the slots and whose length is only slightly longer than the slots mounted within each slot exerting longitudinal pressure on the inner surface of the outer member adjacent to the exposed ends, said pressure providing coupling means so that the rotation of one member will cause rotation of the other, said resilient means engaging the inner surface of the outer member at an angle other than 90° so that driving force is applied to the inner member when the outer member is rotated in one direction with respect thereto maintaining substantially bending moment on each spring means, but which may slip upon relative motion in the opposite direction.

4. In a clutch mechanism, a central rotatable member having a disc-shaped section with peripherally spaced substantially radial slots therein, said slots having a reduced section intermediate the ends thereof, resilient strip spring members whose form is similar to that of the slots whose thickness is less than slot width and whose length is only slightly longer than the slots mounted in the same and extending beyond the outer ends thereof, bearing means mounted on said central member, and a second rotatable member mounted on said bearing means around said disc-shaped section whose inner surface is engaged by the ends of the resilient strips to cause a wedging action when the second member tends to rotate with respect to the first maintaining substantially constant bending moment on each strip spring member.

References Cited in the file of this patent

UNITED STATES PATENTS

| | | |
|---|---|---|
| 2,075,130 | Osterholm | Mar. 30, 1937 |
| 2,468,867 | Collins | May 3, 1949 |

FOREIGN PATENTS

| | | |
|---|---|---|
| 349,252 | Great Britain | May 28, 1931 |
| 470,540 | Canada | Jan. 2, 1951 |